(12) United States Patent
Wilmot et al.

(10) Patent No.: US 8,408,350 B2
(45) Date of Patent: Apr. 2, 2013

(54) EXTERNAL AIRBAG

(75) Inventors: Larry M. Wilmot, Oxford, MI (US); Andrew J. Pitonyak, Auburn Hills, MI (US)

(73) Assignee: TK Holdings Inc., Auburn Hills, MI (US)

(*) Notice: Subject to any disclaimer, the term of this patent is extended or adjusted under 35 U.S.C. 154(b) by 0 days.

(21) Appl. No.: 13/451,471

(22) Filed: Apr. 19, 2012

(65) Prior Publication Data

US 2012/0267183 A1    Oct. 25, 2012

Related U.S. Application Data

(60) Provisional application No. 61/478,324, filed on Apr. 22, 2011.

(51) Int. Cl.
*B60K 28/10* (2006.01)
(52) U.S. Cl. ........................................ 180/274; 180/282
(58) Field of Classification Search .................. 180/271, 180/274, 282
See application file for complete search history.

(56) References Cited

U.S. PATENT DOCUMENTS

| | | | |
|---|---|---|---|
| 6,417,764 B2 * | 7/2002 | Tonkin ........................ 340/425.5 |
| 6,923,483 B2 * | 8/2005 | Curry et al. ...................... 293/107 |
| 7,073,619 B2 * | 7/2006 | Alexander et al. ............. 180/274 |
| 7,753,159 B2 * | 7/2010 | Kim et al. ........................ 180/274 |
| 7,784,817 B2 * | 8/2010 | Choi et al. .................. 280/728.2 |
| 7,828,322 B2 | 11/2010 | Breuninger et al. |
| 2003/0155750 A1 | 8/2003 | Hu et al. |
| 2005/0269805 A1 * | 12/2005 | Kalliske et al. ............. 280/730.1 |
| 2009/0102167 A1 | 4/2009 | Kitte et al. |
| 2009/0152041 A1 | 6/2009 | Kim |

* cited by examiner

*Primary Examiner* — Faye M. Fleming
(74) *Attorney, Agent, or Firm* — Foley & Lardner LLP

(57) ABSTRACT

An airbag module for use in a vehicle. The airbag module an airbag cushion configured to deploy externally to the vehicle and an inflator configured to inflate the at least three inflatable chambers of the airbag cushion. The airbag cushion is configured to span between first and second ends and having at least three inflatable chambers. The airbag cushion is configured to be anchored at both ends and deploys into a position wherein at least one inflatable chamber is entirely separated from the vehicle by a gap formed by the deployed airbag cushion projecting away from the vehicle, and wherein the deployed airbag is configured to hinge between the first and second end so that the gap is bounded by the at least three inflatable chambers.

20 Claims, 9 Drawing Sheets

EXTERNAL AIRBAG

CROSS-REFERENCE TO RELATED PATENT APPLICATIONS

This application claims the benefit of and priority to U.S. Provisional Patent Application No. 61/478,324, filed Apr. 22, 2011. The foregoing provisional patent application is incorporated by reference herein in its entirety.

BACKGROUND

The present application generally to the field of airbag cushions for use with vehicles, such as moving vehicles. More specifically, the present application relates to an airbag module mounted to a vehicle having an airbag cushion that is configure to deploy external to the vehicle, such as from the front of the vehicle.

SUMMARY

One disclosed embodiment relates to an airbag module for use in a vehicle. The airbag module includes an airbag cushion configured to deploy externally to the vehicle, the airbag cushion having at least three inflatable chambers, and an inflator configured to inflate the at least three inflatable chambers of the airbag cushion. The at least one inflatable chamber is configured to deploy to a position that is separated from the vehicle by a gap.

The airbag cushion may include a central chamber disposed between side or end chambers, wherein the central chamber may be separated from each side chamber by a hinge. The airbag cushion may include a first panel that is configured to form a generally convex shape relative to a front end of the vehicle when deployed. The central chamber may be configured to have an inflated volume that is larger relative to an inflated volume of each of the two side chambers. Each inflatable chamber may be in fluid communication with each adjacent inflatable chamber. The airbag module may include a plurality of side chambers. For example, the airbag cushion may include a central chamber disposed between a pair of side or end chambers located at one end of the airbag and a pair of side or end chambers located at another end of the airbag, wherein each pair of adjacent chambers is interconnected by a hinge.

Another disclosed embodiment relates to an airbag module for use in a vehicle. The airbag module an airbag cushion configured to deploy externally to the vehicle and an inflator configured to inflate the at least three inflatable chambers of the airbag cushion. The airbag cushion is configured to span between first and second ends and having at least three inflatable chambers. The airbag cushion is configured to be anchored at both ends and deploys into a position wherein at least one inflatable chamber is entirely separated from the vehicle by a gap formed by the deployed airbag cushion projecting away from the vehicle, and wherein the deployed airbag is configured to hinge between the first and second end so that the gap is bounded by the at least three inflatable chambers.

The airbag module may also include a tether. The tether may have a first end and a second end, the first end being coupled to one of the inflatable chambers and the second end being coupled to another one of the inflatable chambers. Alternatively, the tether may have a first end coupled to a distal end of one of the side chambers and a second end coupled to a distal end of the other side chamber, wherein each distal end is located opposite the hinge of the respective side chamber. A length between the first and second ends of the tether may be shorter relative to a length between the distal ends of the side chambers.

Another disclosed embodiment relates to an airbag module for use with a vehicle. The airbag module includes a cushion having an inflatable chamber, an inflator configured to inflate the inflatable chamber, and a tether coupled to the cushion at a first connection and a second connection. A length of the tether between the first and second connections is shorter relative to a length of the cushion between the first and second connections. The cushion is configured to deploy externally to the vehicle.

The airbag cushion may include a first panel having a central portion separated from at least one right side portion and at least one left side portion by seams, and wherein the central portion is configured to deploy to a location that is separated from the vehicle by a distance. The airbag cushion may include a second panel configured to form a generally convex shape upon deployment. The first panel may be coupled to the second panel at the seams to form a central chamber that is separated from a pair of side or end chambers by hinges. The central chamber may be in fluid communication with both side chambers. The central chamber may be configured to have an inflated volume that is larger relative to an inflated volume of each of the right side and left side chambers. The first connection may be located at a first distal end of the first panel and the second connection may be located at a second distal end of the first panel.

Yet another disclosed embodiment relates to an inflatable airbag cushion for use in an airbag module. The airbag cushion is configured to deploy externally from a vehicle. The airbag module also includes an inflator for inflating the airbag cushion. The airbag cushion includes a first panel and a second panel coupled to the first panel to form at least three inflatable chambers that are configured in fluid communication. The first panel is configured to form a generally convex shape upon deployment when viewed from above the vehicle. The at least one inflatable chamber is configured to deploy to a position that is separated from the vehicle by a gap.

The airbag cushion may also include a tether coupled to the second panel at first and second connections. A length of the tether between the first and second connections may be shorter relative to a length of the second panel between the first and second connections.

BRIEF DESCRIPTION OF THE DRAWINGS

Features, aspects, and advantages of the present invention will become apparent from the following description, appended claims, and the accompanying exemplary embodiments shown in the drawings, which are briefly described below.

DETAILED DESCRIPTION

There is currently an interest in providing vehicles with various apparatuses to lesson the trauma experienced by a cyclist or pedestrian involved in a collision with the vehicle. These may include measures such as hoods that are configured to pop up, exterior airbags that deploy over the windshield and exterior airbags that deploy over the front of the vehicle. However, current front-mounted airbag cushions may be unable to handle the high energy levels needed to mitigate pedestrian injuries and may not provide sufficient lateral movement of the pedestrian. Further, current front-mounted airbag cushions require large amounts of gas to inflate and a long inflation time.

U.S. Pat. No. 7,828,322 discloses airbags configured to include an envelope space, such as where the ratio of volume of the enveloped space over the volume of the inflated airbag is greater than about 1.0. The airbags may also include connection members configured to connect to the airbag cushions. U.S. Pat. No. 7,828,322 is hereby incorporated by reference in its entirety. As explained and taught further below, airbags with a gap or envelope space (e.g., those airbags disclosed in U.S. Pat. No. 7,828,322) may be configured specifically to be employed in an exterior position on a vehicle.

The present application discloses exterior mounted airbag cushions for vehicles. The airbag cushions are configured to deploy externally to the vehicle in order to, for example, reduce the likelihood of injury to impacted pedestrians. The airbag cushions may have a convex shaped when deployed, such as to reduce the volume of gas needed for inflation, which may allow for a smaller inflator, increase the likelihood that a pedestrian involved in a collision will be directed to the side of the vehicle, and provide improved energy management to better absorb the force of the impact with a pedestrian. The airbag cushions may also be configured having multiple chambers, where at least one chamber is separated from the vehicle by a gap to allow the airbag cushion to collapse upon impact by the pedestrian to absorb energy to reduce the impact forces on the pedestrian.

Figure 1:
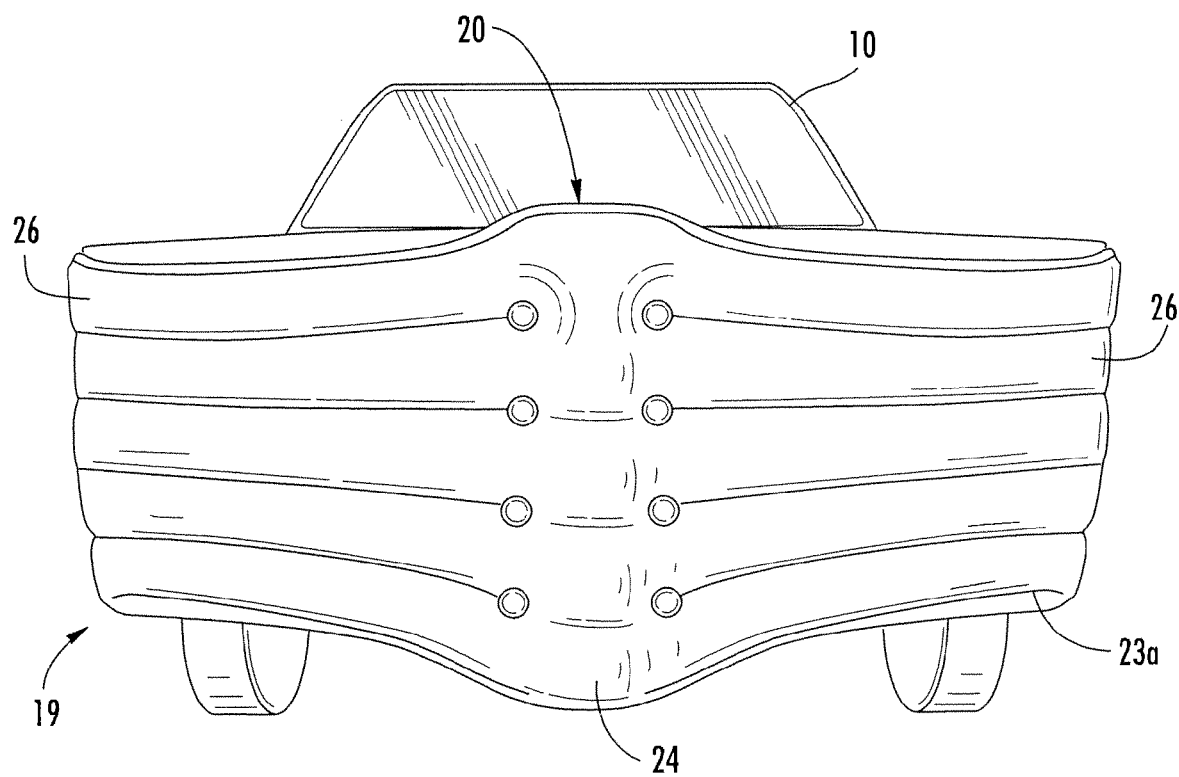
FIG. 1 is a front view of a vehicle with an external convex airbag cushion, according to an exemplary embodiment.
Figure 2:
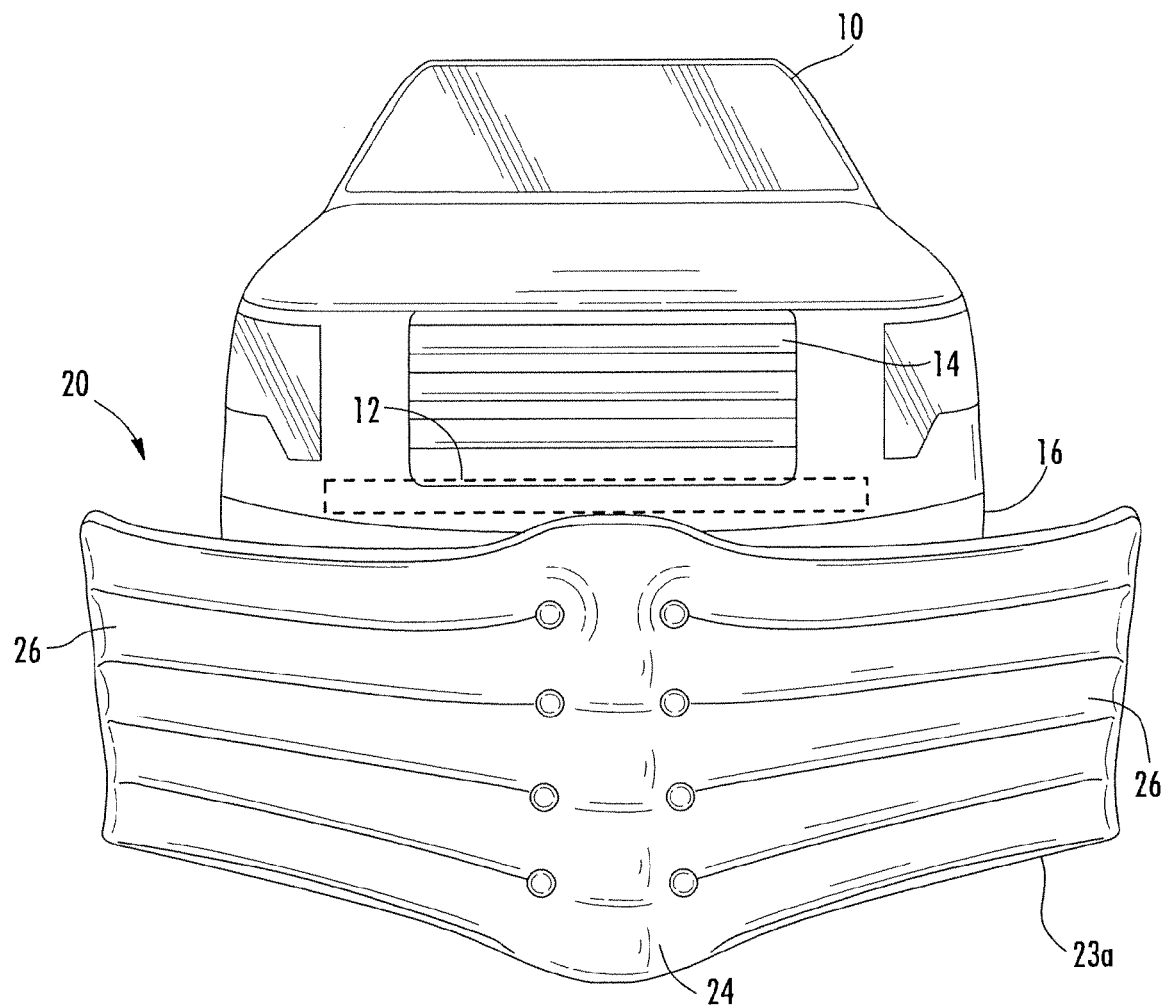
FIG. 2 is an exploded view of the vehicle with an external convex airbag cushion of FIG. 1.

FIGS. 1-2 illustrate an exemplary embodiment of an airbag module 19 having an inflatable airbag cushion 20 configured to deploy from a vehicle 10, such as a front end of the vehicle to cover a portion of the front of the vehicle 10. The airbag module 19 also includes an inflator (not shown) that is configured to inflate the airbag cushion 20 when the airbag module 19 is activated or deployed. The inflator may be configured as any suitable inflation device, such as a pyrotechnic inflator. Prior to airbag deployment (i.e., in an uninflated or non-inflated state), the airbag module and/or airbag cushion 20 may be stored within and deployed from a cavity (e.g., a chamber, a pocket, etc.) in the vehicle. As shown in FIG. 2, the airbag module 19 may be stored and concealed in the cavity 12 located on the front end of the vehicle 10. When the airbag deploys, the airbag cushion breaches the cavity 12 and deploys to a location forward of the cavity 12. For example, the cavity 12 may be located near to, proximate to, or in the vehicle grill 14. However, the cavity 12 may be located in or near to any suitable location of the vehicle, such as the vehicle bumper 16.

Figure 4:
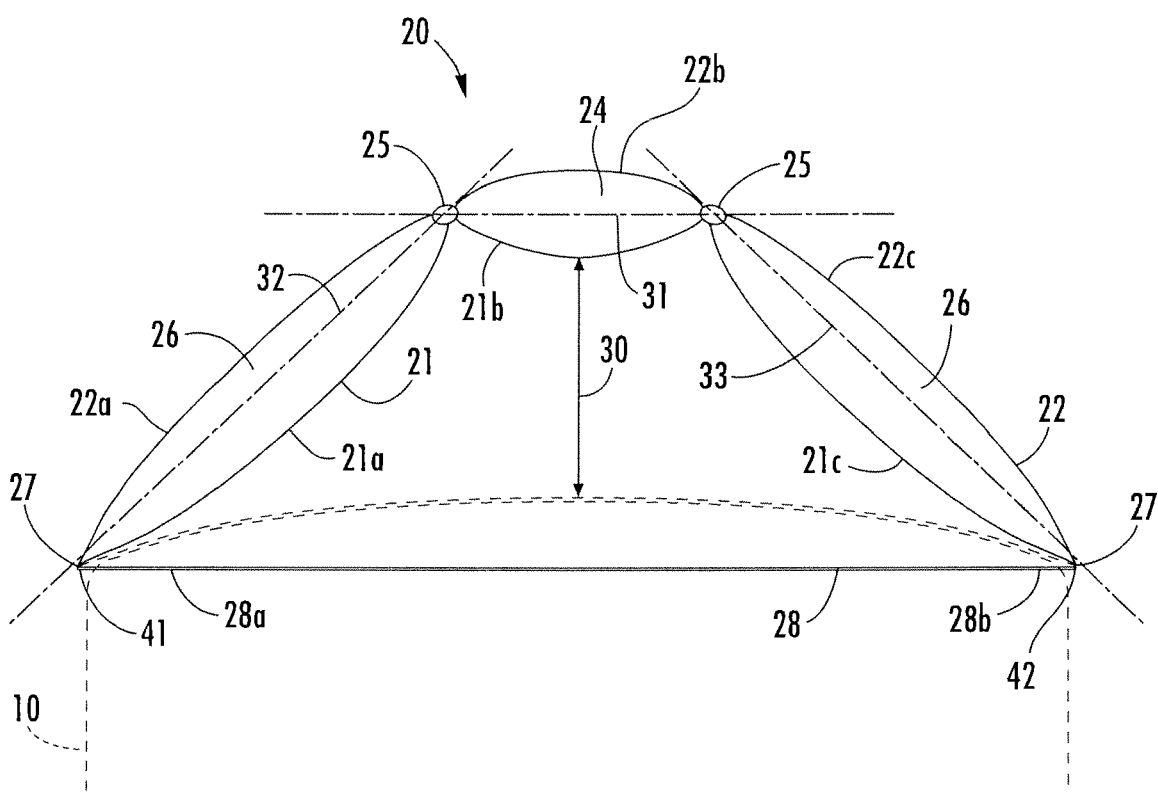
FIG. 4 is a top view of the external convex airbag cushion of FIG. 1.

The airbag cushions as disclosed herein may include one or more panels, which may be interconnected together, such as through stitching at seams to form one or more inflatable chambers. As shown in FIG. 4, the airbag cushion 20 includes a first panel 21 and a second panel 22. The first panel 21 of the airbag cushion 20 may be configured to face toward the vehicle 10 upon deployment. For example, the first panel 21 may be located proximate to the vehicle 10 when the airbag cushion 20 is inflated. The second panel 22 may be configured to face away from the vehicle 10 upon deployment. For example, the second panel 22 may be located opposite of the first panel and proximate to an object colliding with the vehicle (e.g., a pedestrian, a cyclist, etc.). The first and second panels 21, 22 may have any suitable shape and may be made from any suitable material. According to an exemplary embodiment, the first panel 21 and the second panel 22 are similarly shaped panels of a woven nylon fabric. According to another exemplary embodiment, the first and second panels 21, 22 are differently shaped panels of a woven polyester fabric. The panels of the airbag cushion 20 may be coated or sealed to prohibit the diffusion or permissibility of inflation gas through the panels.

The first panel 21 may be coupled to the second panel 22 by any suitable method, such as through stitching or adhesives at seams. As shown in FIG. 1, at least a portion of a periphery of the first panel 21 is coupled to at least a portion of a periphery of the second panel 22 with a first stitch 23a sewn to form a seam that defines an interior inflatable chamber (e.g., interior inflatable volume) of the airbag cushion 20. According to another exemplary embodiment, substantially the entire periphery of the panels are sewn to form a continuous seam around the airbag cushion.

The interior inflatable chamber is inflated with a gas produced by an inflator or gas generator (not shown). The inflator may produce a gas, for example, by using a pyrotechnic process. The inflator may be provided anywhere in the airbag module. For example, the inflator may be provided within the interior of the airbag cushion 20 or may be provided at least partially outside of the airbag cushion 20 and extend into the interior through an opening (e.g., an inlet opening) in the airbag cushion 20, such as a gap or break in the stitch (e.g., the stitch 23a). According to an exemplary embodiment, the inflator is provided on a side of the airbag cushion 20 and is coupled to the front of the vehicle 10. The airbag module may also include a housing that is configured to mount the airbag module to the vehicle, such as to the front end of the vehicle 10. The inflator may be configured to be coupled to the housing.

The airbag cushion 20 may be divided and/or sub-divided into two or more inflatable chambers (e.g., inflatable regions). In other words, the interior inflatable volume of the airbag cushion may be divided and/or sub-divided into a plurality of relatively distinct or separate chambers. The plurality of chambers may be configured to be in fluid communication so that inflation gas is able to pass from one inflatable chamber to an adjacent inflatable chamber, to be fluidly separated where inflation gas is unable to pass between adjacent chambers, or having a combination thereof. For the airbag module having the plurality of chambers configured to be fluidly separated, the airbag module may include more than one inflator. For example, the airbag module may include two inflators, where each of the dual inflators is configured to inflate at least one fluidly separated inflatable chamber of the airbag cushion. It should be noted that the number and size (e.g., gas potential) of the inflators is generally related to, among other parameters, the volume of the inflatable regions. Accordingly, larger volume airbag cushions may utilize two or more inflators to properly inflate the airbag cushion in the relatively short desired period of time.

Figure 3:
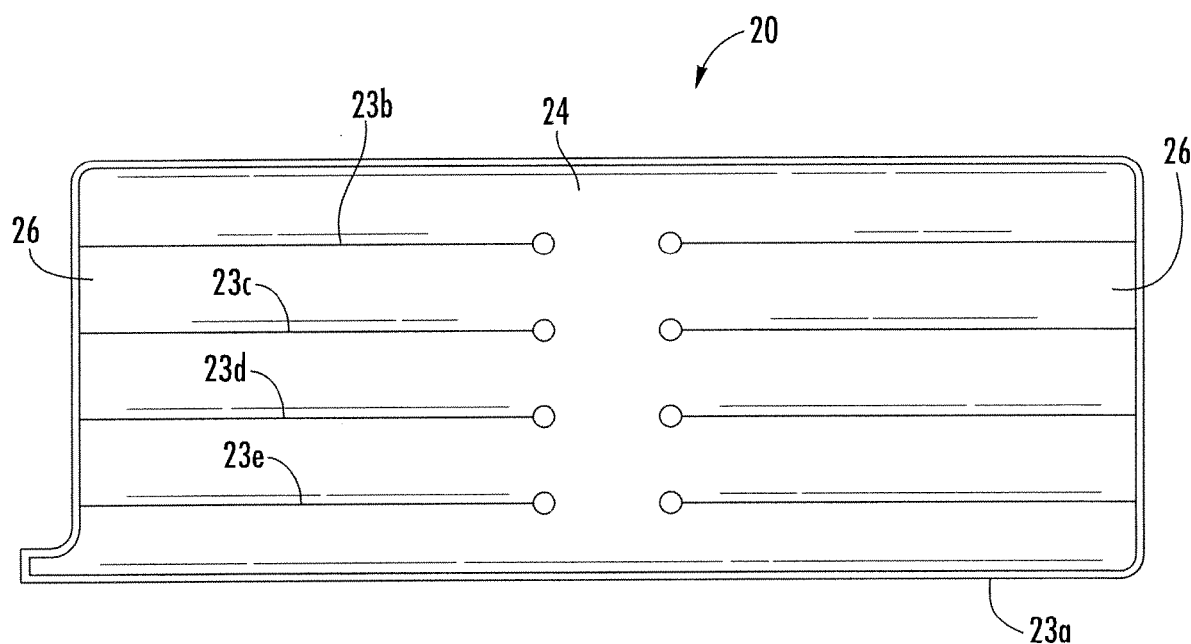
FIG. 3 is a front view of the external convex airbag cushion of FIG. 1 in a non-inflated state.

FIG. 3 illustrates the interior chamber of the airbag cushion 20 being divided into a central chamber 24 and side chambers 26, such as a right-side chamber and a left-side chamber. Although FIG. 3 depicts the side chambers located horizontally relative to the central chamber 24, the chambers may have different relative orientations. For example, the orientation of the deployed airbag may be changed so that the side or end chambers are located above and below the central chamber instead of to the right and left sides. The side or end chambers 26 may also be separated into sub-chambers. As shown in FIG. 3, the side chambers 26 are separated in sub-chambers 26a-26e by stitched seams 23b-23e connecting the panels of the airbag cushion 20. It should be noted that the airbag cushion 20 may be divided into any number of chambers and/or sub-chambers, and the chambers/sub-chambers may have any suitable shape, orientation, and size.

Also shown in FIG. 3, the central chamber 24 and the side chambers 26 are in fluid communication so that the inflation gas can fully inflate the airbag cushion 20 by passing between the chambers 24, 26. By having all of the chambers of the airbag cushion in fluid communication, the airbag module may be configured to have a single inflator directly inflate one chamber and the other chambers may receive inflation gas from the directly inflated chamber or from adjacent chambers.

Figure 5:
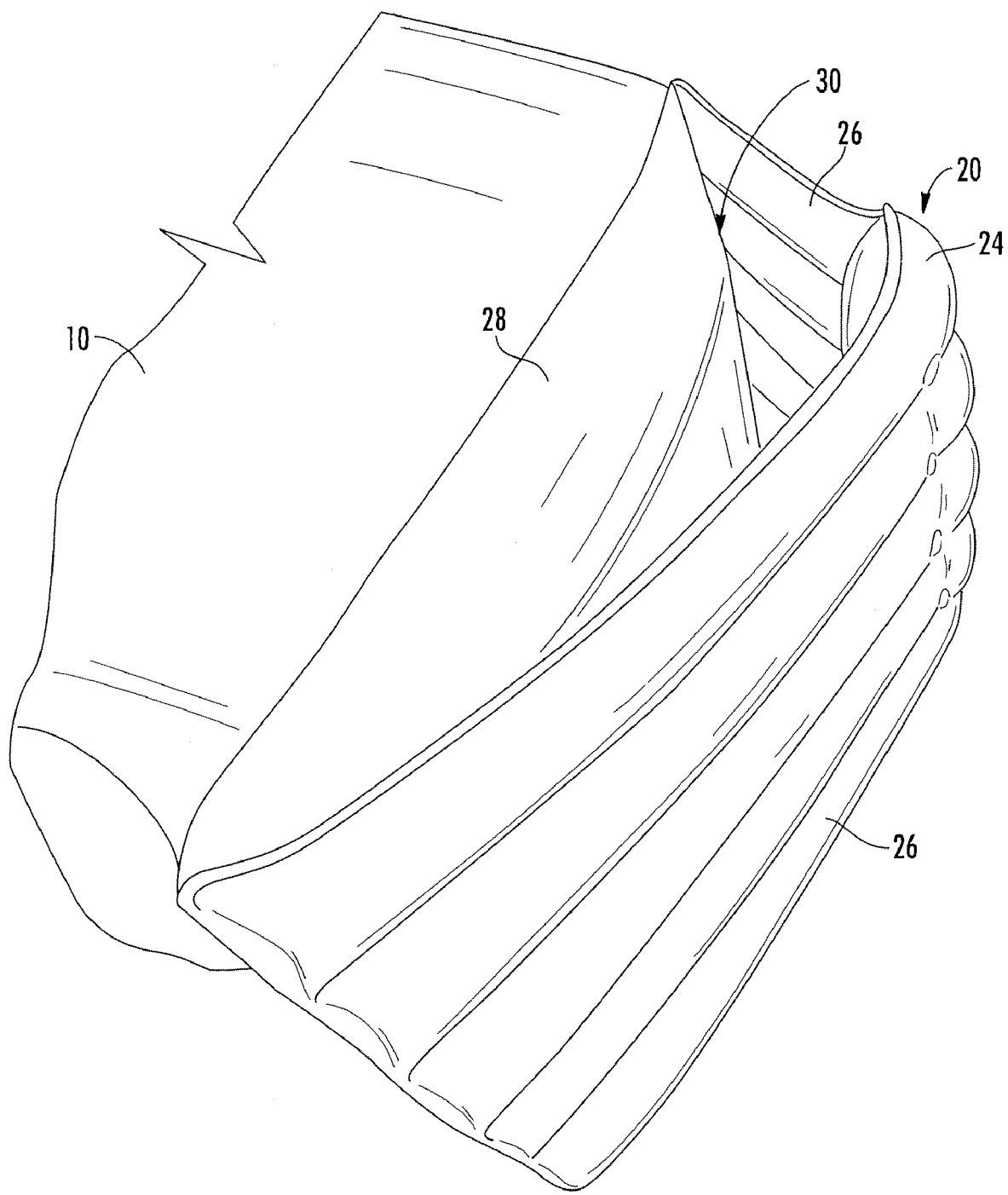
FIGS. 5-7 are perspective views of the vehicle with an external convex airbag cushion of FIG. 1.
Figure 6:
Figure 7:

The central chamber 24 of the airbag cushion 20 may be configured to have an inflated volume that is different (e.g., larger) than an inflated volume of each side chamber 26. According to an exemplary embodiment, once the airbag cushion 20 is inflated (e.g., fully inflated), the central chamber 24 is proportionally larger than the side chambers 26. For example, the central chamber 24 may be configured to have a height when deployed that is greater than a height of the side chambers (see FIGS. 1-2) and/or a depth when deployed that is greater than the depth of the side chambers 26 (see FIGS. 5-7). The proportionally smaller interior volumes of the side chambers 26 may advantageously reduce the interior pressure and the amount of gas needed to inflate the airbag cushion 20. This arrangement may also advantageously reduce the inflation time of the airbag cushion 20.

FIG. 4 illustrates the airbag cushion 20 deployed from the vehicle 10. As shown, the airbag cushion 20 is configured to deploy from a first stored location, such as from the cavity 12 of the vehicle 10, to a second deployed location that is forward of the front end of the vehicle 10. In the second deployed location, each side chamber 26 may remain connected to the vehicle through a distal end 27, which may be located near the outer walls of the vehicle 10, and the central chamber 24 may be disposed between and connected to the side chambers 26, such as through hinges 25. Thus, the first and second panels 21, 22 may be divided into three respective portions forming the three chambers (e.g., central chamber 24 and side chambers 26) by the two hinges 25. The hinges 25 may divide the first panel 21 into a first portion 21a, second portion 21b, and a third portion 21c, where the second portion 21b defines the central chamber 24 and the first and third portions 21a, 21c define the side chambers 26. The hinges 25 may also divide the second panel 22 into a first portion 22a, second portion 22b, and a third portion 22c, where the second portion 22b defines the central chamber 24 and the first and third portions 22a, 22c define the side chambers 26.

Each hinge 25 may have any suitable configuration. For example, each hinge 25 may be configured as a sewn stitch that couples at least a portion of the first panel 21 to at least a portion of the second panel 22. As another example, each hinge 25 may include two (or more) spaced-apart sewn stitches that couple at least a portion of the first panel 21 to at least a portion of the second panel 22 to define a non-inflatable area. The hinge 25 may be relatively flexible to allow the airbag cushion 20 to flex during deployment. This arrangement may advantageously allow the airbag cushion 20 to form a convex shape, such as a convex shape defined by the second panel 22, when deployed.

Upon deployment, each side chamber 26 may extend from its respective distal end 27 at an angle (e.g., oblique angle) relative to a vertical plane (approximating the front of the vehicle). The flexible hinges 25 allow the central chamber 24 to be aligned at an angle relative to the side chambers 26. For example, the central chamber 24 may deploy to a position that is substantially parallel to the vertical plane. In the second deployed location, the central chamber 24 may be positioned forward of the front end of the vehicle 10 with a gap 30 (e.g., spacing) between the central chamber 24 and the front end of the vehicle 10. In other words, the airbag cushion 20 may be configured to deploy so that the central chamber 24 is separated from the front of the vehicle 10 by a distance that defines the gap 30.

The inflated airbag cushion 20 may include three contact planes. For example, the inflated airbag cushion 20 may include a first contact plane 31 defined by the central chamber 24, a second contact plane 32 defined by the left side chamber 26, and a third contact plane 33 defined by the right side chamber 26. Each contact plane (e.g., contact planes 31, 32, 33) may be configured as a vertical plane that passes through the midsection of the respective chamber. For example, the first contact plane 31 of the central chamber 24 may extend between the hinges 25, such that the first panel 21 (e.g., second portion 21b of the first panel 21) may be substantially symmetric to the second panel 22 (e.g., second portion 22b of the second panel 22). Also for example, the second contact plane 32 may extend between the hinge 25 and the distal end 27 of the left side chamber 26, and the third contact plane 33 may extend between the hinge 25 and the distal end 27 of the right side chamber 26.

The convex shape of the inflated airbag cushion 20 has several advantages over a planar (e.g., flat, two-dimensional, etc.) airbag cushion. The convex shape may create a space between the airbag cushion 20 and the front of the vehicle 10, which may allow the airbag cushion to deform or collapse upon impact with an obstacle, such as to absorb energy. For example, the convex shape of the airbag cushion 20 may define the gap 30 between the central chamber 24 and the vehicle 10, such as to absorb energy upon impact. Energy can be absorbed by the airbag cushion 20 as the pedestrian collapses the convex shape and reduces the size of the gap 30, such as to bring the portion(s) of the airbag cushion 20 separated from the vehicle 10 into contact with the vehicle 10. Once the convex shape has collapsed, additional energy may be absorbed as the pedestrian collapses the individual chambers 24 and 26. Further, the convex shape may also cause a pedestrian or other obstacle to engage the inflated airbag cushion 20 earlier in a collision. For example, the angle between the side chambers 26 and the vehicle 10 may increase the size of the gap 30, causing contact between the airbag cushion 20 (e.g., the second panel 22) and the pedestrian sooner to prolong the time in which the airbag cushion 20 collapses into contact (e.g., substantially full contact) with the vehicle 10.

Another advantage of this arrangement of the airbag cushion 20 is the convex shape of the airbag cushion 20 can help direct pedestrians away from the path of the vehicle 10. As a pedestrian impacts the angled or slanted side chambers 26 (e.g., relative to the traveling direction of the vehicle or the front of the vehicle), a reaction force imparted into the pedestrian from the airbag cushion 20 includes a lateral force vector in addition to a foreaft force vector. The later force vector acts to direct the pedestrian away from the front of the vehicle, such as toward the side walls of the vehicle 10. Thus, this arrangement of the airbag cushion 20 by inducing the lateral force reduces the likelihood that the pedestrian will remain in the path of the vehicle and reduces the risk of additional injury to the pedestrian caused by being run over by the vehicle.

The airbag module 19 may also include a tether 28 configured to influence the deployment of the airbag cushion 20. For example, the tether 28 may be coupled to the side chambers 26 to induce a tension during deployment of the airbag cushion 20 that helps the airbag cushion 20 form the convex shape. As shown in FIG. 4, the distal ends 27 of the side chambers 26 are coupled together with a tether 28. The tether 28 may include a first end 28a and a second end 28b. As shown, the first end 28a is coupled at a first connection 41 to the distal end 27 of the left side chamber 26 and the second end 28b is coupled at a second connection 42 to the distal end 27 of the right side chamber 26. The tether 28 may be coupled to the airbag cushion 20 at the first and second connections 41, 42 by any suitable method, such as by sewn stitches, adhesive, or a combination thereof. According to another exemplary embodiment, the first and second connections 41, 42 are formed by retaining members (not shown) of the vehicle configured to receive and retain both the distal ends of the airbag cushion 20 and the tether 28 during deployment. The retaining members may have any suitable configuration, such as including clamping brackets or fasteners.

The tether 28 may be made of or formed from any suitable material, such as the same material (e.g., woven nylon fabric, polyester fabric, etc.) as the airbag cushion 20. According to one exemplary embodiment, the tether 28 may be a single panel (i.e., a two-dimensional tether). For example, the two-dimensional tether 28 may be configured to influence the airbag cushion 20 during deployment by inducing a tension along a single vector, such as by pulling in two opposing directions from the two ends of the tether 28. According to other exemplary embodiments, the tether 28 may be formed of several panels so that the tether 28 more closely matches the geometry of the front of the vehicle 10 (i.e., a three-dimensional tether) to increase the level of tension and stability of the airbag cushion 20. For example, the three-dimensional tether 28 may be configured to induce tension along a plurality of vectors to influence deployment of the airbag cushion 20 in more than one direction.

According to an exemplary embodiment, a width or length (e.g., cross vehicle distance) between the distal ends 27 of the airbag cushion 20 is longer than a width or length between the ends of the tether 28 and/or the front of the vehicle 10. For example, the length of the airbag cushion 20, such as the first panel 21, between the first and second connections 41, 42 may be greater than the length of the tether 28 between the first and second connections 41, 42. In other words, the length of tether between the connections is shorter relative to the length of the airbag cushion (e.g., panel) between the same connections. During deployment, the tether 28 may be put in tension prior to the panel of the airbag cushion 20 causing the hinges 25 to flex to allow the chambers (e.g., central chamber 24, side chambers 26) to form the convex (e.g., arched, arcuate) shape.

Figure 8:
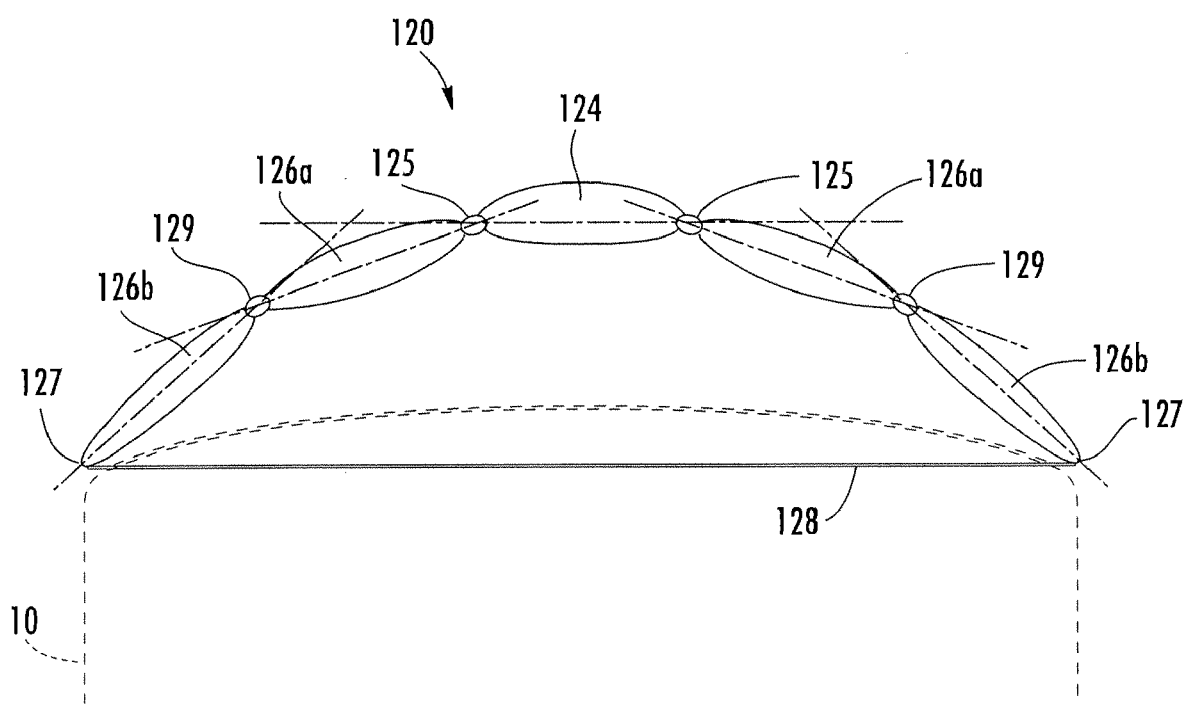
FIG. 8 is a top view of an external convex airbag cushion, according to another exemplary embodiment.

While the airbag cushion 20 is described as having a convex shape formed by two hinges 25, it should be understood that many variations are possible. In other embodiments, the airbag cushion may include any number of hinges 25. FIG. 8 illustrates another exemplary embodiment of an airbag cushion 120 having a first pair of hinges 125 (e.g., hinge points, hinge lines, etc.) provided between a first pair of side chambers 126a and a central chamber 124, and a second pair of hinges 129 provided between the first pair of side chambers 126a and a second pair of side chambers 126b. Thus, the inflated airbag cushion 120 is configured to have five contact planes when deployed, with each contact plane being defined by one of the five respective chambers. The airbag cushion 120 may include distal ends 127 provided at the ends of the second pair of side chambers 126b that are opposite the hinges 129. The distal ends 127 may couple the airbag cushion 120 to the vehicle upon deployment. The airbag cushion 120 may also include a tether 128 configured to influence the deployment of the airbag cushion 120. The tether 128 may be configured the same as, similar to, or different than the tether 28 used in the airbag cushion 20.

Figure 9:
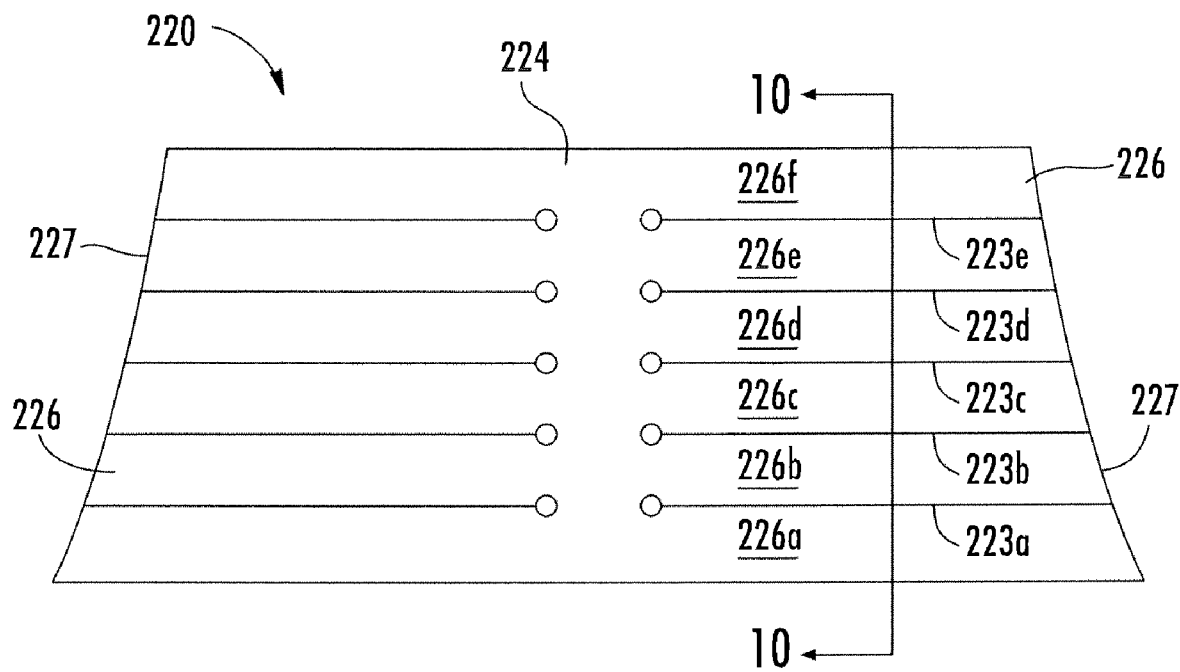
FIG. 9 is a front view of another exemplary embodiment of an airbag cushion configured to deploy externally to a vehicle.
Figure 10:
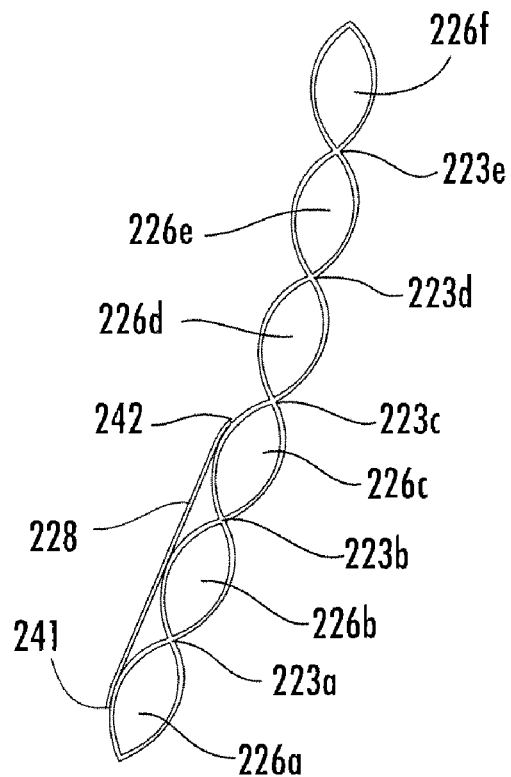
FIG. 10 is a cross-sectional view of the airbag cushion of FIG. 9 shown in the deployed state having a concave shape.

FIGS. 9-10 illustrate yet another exemplary embodiment of an airbag cushion 220 for use in an airbag module, such as airbag module 19. As shown in FIG. 9, the airbag cushion 220 includes a central chamber 224 that is disposed between two side chambers 226, where the chambers are defined by one or more panels being coupled together, such as at seams. The airbag cushion 220 has distal ends 227 (e.g., distal edges) that are configured to have an arcuate (e.g., curved, concave) shape when deployed. Each distal end 227 may be configured to curve outwardly (when viewed from the front) moving from the top of the airbag cushion 220 to the bottom of the airbag cushion 220. As shown in FIG. 10, the airbag cushion 220 may also have an arcuate shape (when viewed from the side) when deployed. The airbag cushion 220 may curve outwardly (e.g., away from the front of the vehicle) from the top of the airbag cushion 220 to the bottom of the airbag cushion 220. The airbag cushion 220, such as the side chambers 226, may be sub-divided into sub-chambers 226a-226f by a plurality of stitches 223a-223e. The plurality of stitches 223a-223e may act as hinges for the airbag cushion 220 to flex along the hinges to allow the airbag cushion 220 to take the arcuate shape when deployed.

As shown in FIG. 10, the airbag cushion 220 may include a tether 228 to help influence the deployment of the airbag cushion. For example, the airbag cushion 220 may include a tether 228 that extends in an upward oblique angle, such as in an upward and rearward direction. The tether 228 may be coupled to the airbag cushion at a plurality of connections to induce a tension during deployment to influence the airbag trajectory and/or shape. For example, the tether 228 has a first end coupled to a first sub-chamber 226a at a first connection 241 and a second end coupled to another sub-chamber, such as a third sub-chamber 226c, at a second connection 242. The first connection 241 may be located anywhere on the first sub-chamber 226a, such as at a seam. The second connection 242 may be located anywhere on the third-sub-chamber 226c, such as at a seam defined by the stitch 223c. The tether 228 may advantageously help influence the deploying airbag cushion 220 to form the arcuate shape (when viewed from the side).

The configuration of the airbag cushion 220 may advantageously help reduce the likelihood of injury to an impacted pedestrian. For example, the airbag cushion 220 may reduce (or eliminate) the tendency of the impacted pedestrian to submarine (i.e., being pushed in a downward direction toward the underside of the vehicle). The arcuate shape of the airbag cushion 220 may cause the inflated cushion to first impact the pedestrian at the lower legs and impart an upward force on the pedestrian thereby lifting the pedestrian to prohibit the tendency to submarine. Additionally, taller vehicles (e.g., trucks, SUVs, ORVs), which tend to have bumpers that are higher from the ground relative to passenger vehicles may have an increased benefit by utilizing such airbag cushions 220. For example, such taller vehicles generally are unable to have a fixed or permanent device to catch the lower legs of a pedestrian (like with some passenger cars) because of the need to have an increased ground clearance to provide the "off-road" capability of the vehicle. Because of this arrangement, these vehicles have a relatively greater likelihood of running over pedestrians upon impact of the pedestrian with the vehicle. Thus, these vehicles may see an increased benefit in utilizing the airbag cushions as disclosed herein. Further, the arcuate shaped distal ends of the airbag cushion 220 may also reduce the likelihood of injury to the impacted pedestrian. Moreover, the stiffness of the airbag cushion 220 may be tuned to further reduce the likelihood of injury to an impacted pedestrian.

It should be noted that although the airbag modules and cushions as disclosed herein are described to protect pedestrians, which may include, among others, walking pedestrians, cyclists, joggers and so forth, these airbag modules and cushions may also protect any other living being, such as pets, wild animals (e.g., deer) and so forth. In other words, the airbag modules and cushions as disclosed herein are not limited to restraining and protecting human beings, but may also protect any living being.

The present disclosure has been described with reference to example embodiments, however persons skilled in the art will recognize that changes may be made in form and detail without departing from the spirit and scope of the disclosed subject matter. For example, although different example embodiments may have been described as including one or more features providing one or more benefits, it is contemplated that the described features may be interchanged with one another or alternatively be combined with one another in the described example embodiments or in other alternative embodiments. Because the technology of the present disclosure is relatively complex, not all changes in the technology are foreseeable. The present disclosure described with reference to the exemplary embodiments is manifestly intended to be as broad as possible. For example, unless specifically otherwise noted, the exemplary embodiments reciting a single particular element also encompass a plurality of such particular elements.

It is important to note that the construction and arrangement of the external airbag as shown in the various exemplary embodiments is illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter disclosure herein. For example, elements shown as integrally formed may be constructed of multiple parts or elements, the position of elements may be reversed or otherwise varied, and the nature or number of discrete elements or positions may be altered or varied. Accordingly, all such modifications are intended to be included within the scope of the present application. The order or sequence of any process or method steps may be varied or re-sequenced according to alternative embodiments. Other substitutions, modifications, changes and omissions may be made in the design, operating conditions and arrangement of the exemplary embodiments.

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

It should be noted that the term "exemplary" as used herein to describe various embodiments is intended to indicate that such embodiments are possible examples, representations, and/or illustrations of possible embodiments (and such term is not intended to connote that such embodiments are necessarily extraordinary or superlative examples).

The terms "coupled," "connected," and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

References herein to the positions of elements (e.g., "top," "bottom," "above," "below," etc.) are merely used to describe the orientation of various elements in the FIGURES. It should be noted that the orientation of various elements may differ according to other exemplary embodiments, and that such variations are intended to be encompassed by the present disclosure.

It is important to note that the construction and arrangement of the airbag modules as shown in the various exemplary embodiments are illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. For example, elements shown as integrally formed may be constructed of multiple parts or elements, the position of elements may be reversed or otherwise varied, and the nature or number of discrete elements or positions may be altered or varied. The order or sequence of any process or method steps may be varied or re-sequenced according to alternative embodiments. Other substitutions, modifications, changes and omissions may also be made in the design, operating conditions and arrangement of the various exemplary embodiments without departing from the scope of the present invention.

What is claimed is:

1. An airbag module for use with a vehicle, the airbag module comprising:
    an airbag cushion configured to deploy externally to the vehicle, the airbag cushion spanning between first and second ends and having at least three inflatable chambers; and
    an inflator configured to inflate the at least three inflatable chambers of the airbag cushion;
    wherein the airbag cushion is configured to be anchored at both ends and deploys into a position wherein at least one inflatable chamber is entirely separated from the vehicle by a gap formed by the deployed airbag cushion projecting away from the vehicle, and wherein the deployed airbag is configured to hinge between the first and second end so that the gap is bounded by the at least three inflatable chambers.

2. The airbag module of claim 1, wherein the at least three inflatable chambers include a central chamber disposed between first and second end chambers.

3. The airbag module of claim 2, wherein the central chamber is separated from each end chamber by a hinge.

4. The airbag module of claim 3, wherein the airbag cushion includes a first panel that is configured to form a generally convex shape relative to a front end of the vehicle when deployed.

5. The airbag module of claim 2, wherein the central chamber is configured to have an inflated volume that is larger relative to an inflated volume of each of the two end chambers.

6. The airbag module of claim 1, further comprising a tether having a first end and a second end, the first end being coupled to one of the inflatable chambers and the second end being coupled to another one of the inflatable chambers.

7. The airbag module of claim 3, further comprising a tether having a first end coupled to a distal end of one of the end chambers and a second end coupled to a distal end of the other end chamber, wherein each distal end is located opposite the hinge of the respective end chamber.

8. The airbag module of claim 7, wherein a length between the first and second ends of the tether is shorter relative to a length between the distal ends of the end chambers.

9. The airbag module of claim 1, wherein the airbag cushion includes a central chamber disposed between a pair of right side chambers and a pair of left side chambers, wherein each pair of adjacent chambers is interconnected by a hinge.

10. The airbag module of claim 1, wherein each of the at least three inflatable chambers is in fluid communication with each adjacent inflatable chamber.

11. An airbag module for use with a vehicle, the airbag module comprising:
   a cushion having an inflatable chamber;
   an inflator configured to inflate the inflatable chamber; and
   a tether coupled to the cushion at a first connection and a second connection;
   wherein a length of the tether between the first and second connections is shorter relative to a length of the cushion between the first and second connections;
   wherein the cushion is configured to deploy externally to the vehicle.

12. The airbag module of claim 11, wherein the cushion includes a first panel having a central portion separated from at least one right side portion and at least one left side portion by seams, and wherein the central portion is configured to deploy to a location that is separated from the vehicle by a distance.

13. The airbag module of claim 12, wherein the cushion includes a second panel configured to form a generally convex shape relative to the vehicle when viewed from above upon deployment of the cushion.

14. The airbag module of claim 13, wherein the first panel is coupled to the second panel at the seams to form a central chamber that is separated from at least one right side chamber and at least one left side chamber by hinges.

15. The airbag module of claim 14, wherein the central chamber is in fluid communication with both side chambers.

16. The airbag module of claim 14, wherein the central chamber is configured to have an inflated volume that is larger relative to an inflated volume of each of the right side and left side chambers.

17. The airbag module of claim 12, wherein the first connection is located at a first distal end of the first panel and the second connection is located at a second distal end of the first panel.

18. An inflatable airbag cushion for use in an airbag module that is configured to deploy externally from a vehicle, the airbag module also having an inflator for inflating the airbag cushion, the airbag cushion comprising:
   a first panel; and
   a second panel coupled to the first panel to form at least three inflatable chambers that are configured in fluid communication;
   wherein the first panel is configured to form a generally convex shape upon deployment when viewed from above the vehicle;
   wherein at least one inflatable chamber is configured to deploy to a position that is separated from the vehicle by a gap.

19. The airbag cushion of claim 18, further comprising a tether coupled to the second panel at first and second connections.

20. The airbag cushion of claim 19, wherein a length of the tether between the first and second connections is shorter relative to a length of the second panel between the first and second connections.

* * * * *